Feb. 3, 1959

C. E. MARTIN 2,872,151

THREE DIMENSIONAL CAM

Filed Nov. 15, 1956

INVENTOR.
CARLETON E. MARTIN
BY
ATTORNEYS

Feb. 3, 1959

C. E. MARTIN 2,872,151

THREE DIMENSIONAL CAM

Filed Nov. 15, 1956

INVENTOR.
CARLETON E. MARTIN
BY
ATTORNEYS 2,872,151

THREE DIMENSIONAL CAM

Carleton E. Martin, Palo Alto, Calif., assignor to the United States of America as represented by the Secretary of the Navy Application November 15, 1956, Serial No. 622,507

8 Claims. (Cl. 251—58)

This invention relates to a device for combining separate inputs into one output motion.

There are many instances where it is desirable to combine two varying quantities into a unitary movement. For example, areas is the result of the varying functions of length and width; electric power is the result of the varying functions of voltage and amperage, and force is the result of varying the functions of mass and acceleration.

In the instant invention a three dimensional cam is responsive to the output of a pair of bellows. Any desired varying functions may be fed into the bellows which control the position of the cam. The cam is operatively connected to a parallel arm mechanism so that the longitudinal axis of the cam remains fixed in orientation as the came is moved by the bellows. A rod riding on the three dimensional surface of the cam regulates the size of a control orifice. As the bellows change the position of the cam, the rod varies the orifice to represent the output of the varying inputs.

It is an object of this invention to provide a three dimensional cam that will give a definite output motion for any combination of two separate inputs.

It is a further object of the invention to provide a wedge cam having three degrees of freedom moving in constant parallelism to itself to combine two separate varying functions into one definite output.

Other objects and many of the attendant advantages of this invention will be readily appreciated as the same becomes better understood by reference to the following detailed description when considered in connection with the accompanying drawings wherein:

Figure 3 is a cross-sectional view taken along lines 3—3 of Figure 1 and also showing the cam follower mechanism.

Figure 1:
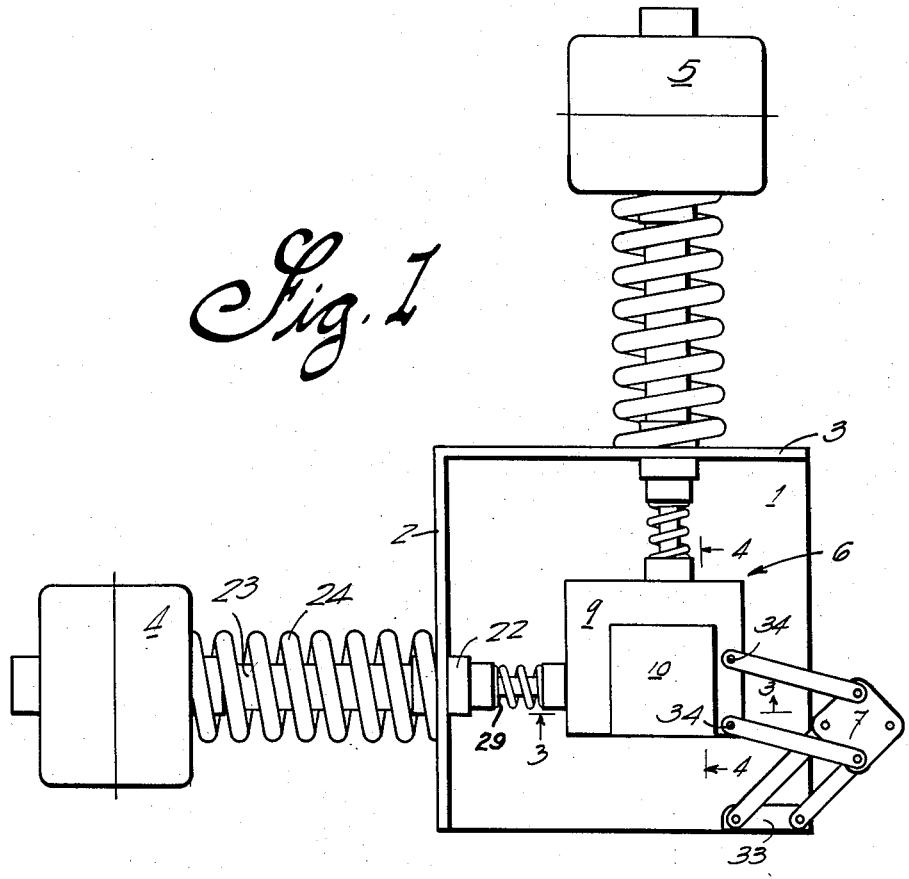
Figure 1 is a top plan view of the apparatus.
Figure 2:
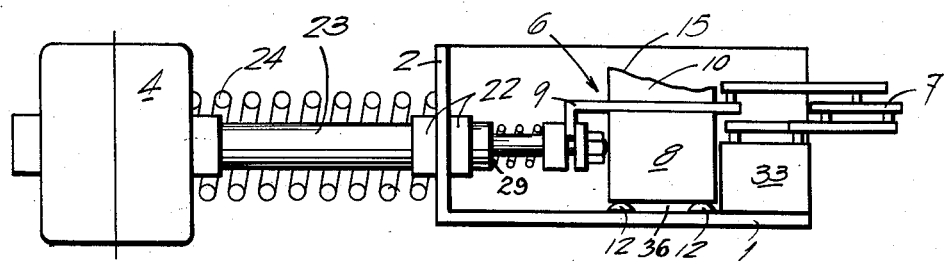
Figure 2 is a side elevation of the apparatus shown in Figure 1.

In Figure 1, there is shown a reference base 1 made of any suitable magnetic material such as iron or steel having upright flange portions 2 and 3 on which are mounted the bellows 4 and 5. These bellows are responsive to any desired functions and represent varying inputs whose combined output is desired. The bellows 4 and 5 are operatively connected to a cam assembly 6 that is maintained in orientation or is constrained to move in paths substantially parallel to the lines of thrust of the bellows 4 and 5 by a parallel motion mechanism 7.

Figure 4:
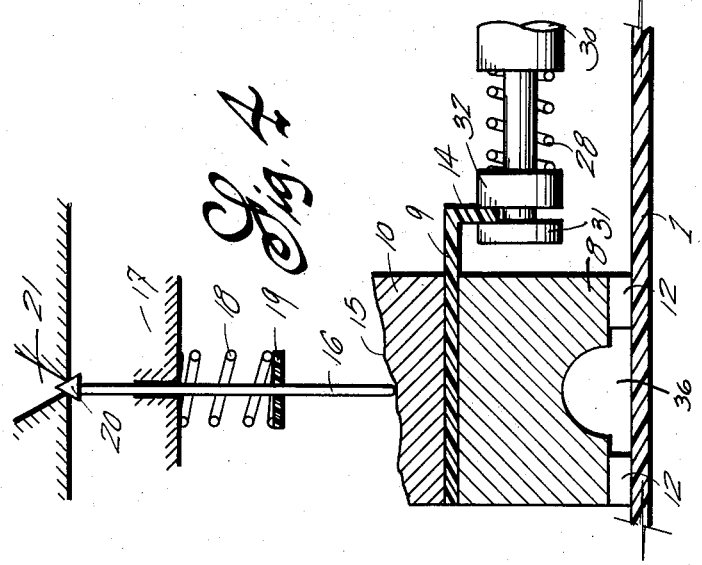
Figure 4 is a cross-sectional view taken along lines 4—4 of Figure 1 and also showing the cam follower mechanism.
Figure 5:
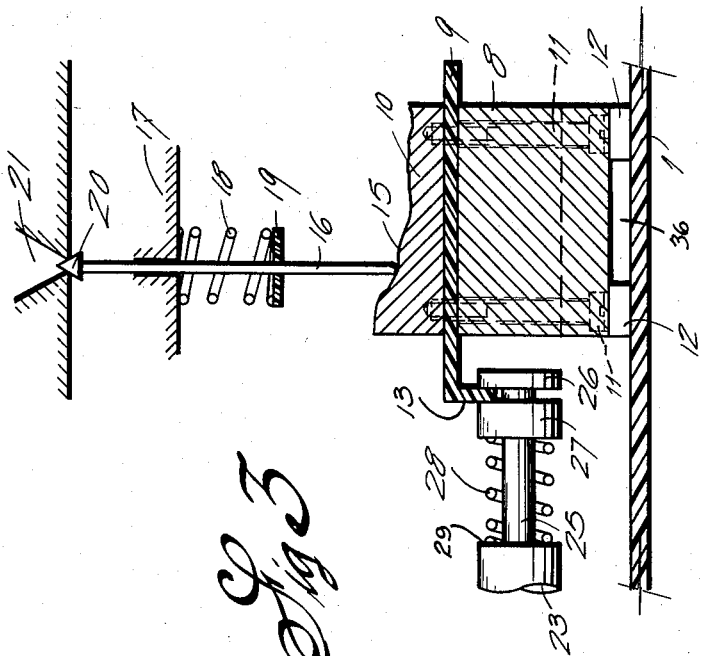

The cam assembly, as shown in Figures 3 and 4, consists of a permanent magnet base or base member 8 on which is mounted a control plate 9 which serves to support the cam 10. A plurality of bolts 11 extend through the base and control plate and are threadedly received in the cam to secure these elements together. The permanent magnet base member 8 of the cam assembly 6 carries a plurality of carbon members or buttons 12 on the underside thereof which provide an air gap 36 between the base member 8 and the reference base 1 and which slideably engage the reference base 1 and thereby support the cam assembly 6 for slideable movement over the surface of the reference base. The carbon buttons 12 provide a relatively frictionless mounting for the cam assembly 6 and thus permit a slideable movement of the cam assembly 6 which is substantially free of frictional drag. The carbon buttons 12 also serve a dual purpose in that they provide a means to vary the strength of the magnetic field in the air gap 36 between the magnetic base member 8 and the reference base 1, the magnetic field constantly tending to urge the cam assembly 6 into engagement with the reference base. By varying the dimensions of the carbon buttons 12, especially the width and thickness thereof, the dimensions of the air gap 36 can also be changed to vary the magnitude of the magnetic attraction between the magnetic base member 8 and the reference base 1 to thereby vary the resistance of the cam assembly 6 to movement along the surface of the reference base. The control plate 9 has depending flanges 13 and 14 that cooperate with the bellows 4 and 5 to position the cam 10.

The cam 10 has an upper surface 15 that varies in the three dimensions of length, width and depth. Riding on the upper surface 15 of the cam 10 is the output rod or cam follower 16. This rod is mounted for sliding non-pivotal movement in the fixed support 17. A spring 18 acting between the fixed support 17 and an abutment 19 on the rod urges the rod against the cam surface 15. At the other end, the rod 16 has a valve member or metering head 20 that fits into an orifice 21 to control the flow through the orifice. Thus, as the rod 16 moves over the cam surface 15 the metering head 20 varies the flow through the orifice 21.

A pair of carbon or roller bearings 22 slideably support the actuating plunger 23 of the bellows 4 for movement through the flange 2. A return spring 24 acting between the flange 2 and the bellows 4 properly positions the bellows. At the other end the plunger 23 has a reduced diameter tip 25. Fixed to the outer end of the tip 25 is a carbon bearing 26. Another carbon bearing 27 is slideably mounted on the tip 25 and is urged into contact with the bearing 26 by a spring 28 acting between the shoulder 29 and the bearing 27. The bearings 26 and 27 receive between them the flange 13 of the control plate 9 thus permitting relative motion between the control plate 9 and the bellows plunger 23 in a plane perpendicular to the longitudinal axis of the plunger. The plunger 30 of the bellows 5 is connected to the flange 14 by carbon bearings 31 and 32 in a manner similar to that of plunger 23.

In order to function properly, it is necessary to maintain the cam in a fixed orientation in any position. This is accomplished by the parallel motion mechanism 7. The block 33 secures one end to the base 1 while at the other end the mechanism is pivotally connected to the control plate 9 at 34. Thus, the control plate, and therefore the cam, remains fixed in orientation in any position to which it is moved by the bellows 4 and 5.

In operation, as viewed in Figure 1, the bellows 4 moves the cam assembly 6 in a horizontal direction while the bellows 5 moves the cam assembly 6 in a vertical direction in response to varying functions fed into the bellows. The parallel motion mechanism 7 functions to maintain the cam assembly fixed in orientation as it is acted on by the bellows and thus restricts the movement of the cam assembly 6 to slideable movement along the reference base 1 in paths which are substantially parallel to the thrust lines of the actuating plungers 23 and 30 of the bellows 4 and 5, respectively. The cam follower rod 16 is urged against the cam surface 15 by the spring 18 so that at any given instant the position of the metering head 20 represents the output of the varying inputs to the bellows. The cam 10 varies in thickness in a horizontal direction with the point of maximum thickness adjacent the flange 13. In the vertical direction the section of maximum thickness is adjacent the flange 14. Thus, the cam surface 15 is truly three dimensional.

Obviously many modifications and variations of the present invention are possible in the light of the above teachings. It is therefore to be understood that within the scope of the appended claims the invention may be practiced otherwise than as specifically described.

What is claimed is:

1. An apparatus for controlling flow through an orifice or the like in response to predetermined changes in a plurality of conditions comprising base means, cam means slideably carried by said base means, first condition responsive means operatively connected to said cam means and being movable in opposite directions along a predetermined path in response to predetermined changes in one of said conditions to thereby move said cam means on said base means, second condition responsive means operatively associated with said cam means and being movable in opposite directions along a predetermined path in response to predetermined changes in another of said conditions to thereby move said cam means on said base means, valve member means cooperable with said cam means and being movable thereby between a plurality of flow controlling positions relative to said orifice, and parallel motion means operatively connected to said cam means and being operable to constrain the movement of said cam means on said base means to movement in paths substantially parallel to the paths of movement of said first and second condition responsive means.

2. An apparatus for controlling flow through an orifice or the like in response to predetermined changes in a plurality of conditions comprising base means, cam assembly means slideably carried by said base means and including three dimensional cam means, means responsive to said predetermined changes in conditions operatively associated with said cam assembly means and being movable along predetermined paths in opposite directions in response to said predetermined changes in conditions to effect movement of said cam assembly means, cam follower means cooperable with said three dimensional cam means and being movable in opposite directions in response to movement of said cam assembly means, head means carried by said cam follower means and being movable thereby in opposite directions between a plurality of flow controlling positions relative to said orifice, and parallel motion means associated with said cam assembly means for constraining the movement of said cam assembly means to paths substantially parallel to the predetermined paths of movement of said means responsive to said predetermined changes in conditions.

3. An apparatus for controlling flow through an orifice or the like in response to predetermined changes in a plurality of conditions comprising base means, cam means including a three dimensional cam slideably carried by said base means, first expansible and contractible means operatively associated with said cam means and being movable along a predetermined path in opposite directions in response to predetermined changes in one of said conditions to move said cam means on said base means through predetermined ranges of movement, second expansible and contractible means operatively associated with said cam means and being movable along a predetermined path in opposite directions in response to predetermined changes in another of said conditions to move said cam means on said base means through other predetermined ranges of movement, cam follower means cooperable with said three dimensional cam and being movable in opposite directions thereby in response to movement of said cam means, head means carried by said cam follower means and being movable in opposite directions thereby between a plurality of flow controlling positions relative to said orifice, and parallel motion means associated with said cam means and base means for maintaining the orientation of said cam means relative to said base means.

4. An apparatus for controlling flow through an orifice or the like in response to predetermined changes in a plurality of conditions comprising a base member, a cam assembly slideably carried by said base member and including a control plate and a three dimensional cam, first expansible and contractible means having an actuating plunger operatively connected to said control plate and being operable in response to predetermined changes in one of said conditions to move said cam assembly through predetermined ranges of movement on said base member, second expansible and contractible means having an actuating plunger operatively connected to said control plate and being operable in response to predetermined changes in another of said conditions to move said cam assembly through other predetermined ranges of movement on said base member, a resiliently biased cam follower cooperable with said three dimensional cam and being movable thereby in opposite directions between a plurality of flow controlling positions relative to said orifice, and a parallel motion mechanism operatively connected to said base member and said cam assembly for constraining the movement of said cam assembly on said base member to movement in paths substantially parallel to the thrust lines of said actuating plungers of said first and second expansible and contractible means.

5. The apparatus claimed in claim 4 further including a pair of flanges on said control plate, a carbon bearing carried on the free end of each of said actuating plungers and being adapted to engage each one of said pair of flanges on one side thereof and a second spring-biased carbon bearing carried by each of said actuating plungers and being adapted to engage the opposite sides of said pair of flanges, said second spring-biased carbon bearings thereby permitting relative movement between said actuating plungers and said cam assembly.

6. An apparatus as claimed in claim 4 wherein said parallel motion mechanism is pivotally connected at one extremity to said cam assembly and pivotally connected at the other extremity to a block carried by said base member.

7. An apparatus for controlling flow through an orifice or the like in response to predetermined changes in a plurality of conditions comprising a magnetic-material base member, a cam assembly slideably carried by said base member and including a magnetic member, a control plate and a three dimensional cam, a plurality of carbon members carried on the underside of said magnetic member for slideably engaging said base member and thereby slideably supporting said cam assembly on said base member, first expansible and contractible means having an actuating plunger operatively connected to said control plate and being operable in response to predetermined changes in one of said conditions to move said cam assembly through predetermined ranges of movement on said base member, second expansible and contractible means having an actuating plunger operatively connected to said control plate and being operable in response to predetermined changes in another of said conditions to move said cam assembly through other predetermined ranges of movement on said base member, cam follower means cooperable with said three dimensional cam and being movable in opposite directions in response to movement of said cam assembly between a plurality of flow controlling positions relative to said orifice, and a parallel motion mechanism operatively connected to said base member and said cam assembly for effecting the orientation of said cam assembly and thereby constraining said cam assembly to movement on said base member in paths substantially parallel to the lines of thrust of said actuating plungers of said first and second expansible and contractible means.

8. An apparatus as claimed in claim 7 wherein the dimensions of said carbon members carried on the underside of said magnetic member may be varied to thereby vary the magnitude of the magnetic attraction between said magnetic material base member and said magnetic member and thereby vary the resistance of said cam assembly to slideable movement on said base member.

References Cited in the file of this patent

UNITED STATES PATENTS

| | | |
|---|---|---|
| 2,222,551 | Ziebolz et al. | Nov. 19, 1940 |
| 2,630,009 | Hebl | Mar. 9, 1953 |
| 2,788,677 | Hayek | Apr. 16, 1957 |